US007280495B1

(12) United States Patent
Zweig et al.

(10) Patent No.: US 7,280,495 B1
(45) Date of Patent: Oct. 9, 2007

(54) RELIABLE BROADCAST PROTOCOL IN A WIRELESS LOCAL AREA NETWORK

(75) Inventors: Jonathan M. Zweig, Cupertino, CA (US); Darwin A. Engwer, Pleasanton, CA (US)

(73) Assignee: Nortel Networks Limited, St. Laurent (CA)

( * ) Notice: Subject to any disclaimer, the term of this patent is extended or adjusted under 35 U.S.C. 154(b) by 582 days.

(21) Appl. No.: 09/753,226

(22) Filed: Dec. 28, 2000

Related U.S. Application Data

(60) Provisional application No. 60/226,343, filed on Aug. 18, 2000.

(51) Int. Cl.
*H04H 1/00* (2006.01)
*H04L 12/56* (2006.01)
*H04J 3/26* (2006.01)

(52) U.S. Cl. ...................... 370/312; 370/390; 370/432; 370/473

(58) Field of Classification Search ................ 370/312, 370/390, 392, 432, 473–474
See application file for complete search history.

(56) References Cited

U.S. PATENT DOCUMENTS 5,239,584 A 8/1993 Hershey et al. ............... 380/28
5,440,545 A 8/1995 Buchholz et al. ............. 370/60
5,444,781 A 8/1995 Lynn et al. ................... 380/46
5,454,026 A 9/1995 Tanaka
5,465,399 A 11/1995 Oberholtzer et al.
5,481,535 A * 1/1996 Hershey ..................... 370/312
5,483,676 A 1/1996 Mahany et al.
5,548,821 A 8/1996 Coveley
5,570,343 A 10/1996 Bishop et al.
5,621,894 A 4/1997 Menezes
5,673,319 A 9/1997 Bellare et al. .............. 713/181

(Continued)

FOREIGN PATENT DOCUMENTS

EP 0 862 143 A2 9/1998

OTHER PUBLICATIONS

Chi-Chun Lo, et al. "QoS provisioning in handoff algorithms for wireless LAN", International Zurich Seminar on Broadband Communications. Accessing, Transmission, Networking, Feb. 17, 1998, pp. 9-16, XP002151137.

(Continued)

*Primary Examiner*—Chi Pham
*Assistant Examiner*—Tri H. Phan
(74) *Attorney, Agent, or Firm*—Blakely Sokoloff Taylor & Zafman, LLP

(57) ABSTRACT

A protocol for acknowledging receipt of a multicast or broadcast frame by a wireless unit is described. One embodiment, an Eavesdrop Unicast frame is created for use in a wireless network operated in accordance with IEEE 802.11. The Eavesdrop Unicast frame allows the targeted wireless unit to transmit acknowledgement (ACK) frame but is configured so that other wireless units can scan and obtain information therefrom. Another embodiment is similar in configuration to the Eavesdrop Unicast frame but is fully compliant with IEEE 802.11. Therein, a multicast or broadcast frame is transmitted but one wireless unit is configured to acknowledge receipt of the multicast or broadcast frame. The acknowledgement is accomplished through transmission of a data frame. Yet another embodiment is the transmission of broadcast or multicast frames into corresponding unicast frames.

19 Claims, 5 Drawing Sheets

U.S. PATENT DOCUMENTS

| | | | | | |
|---|---|---|---|---|---|
| 5,710,885 | A | | 1/1998 | Bondi | |
| 5,715,164 | A | | 2/1998 | Liechti, et al. | 705/410 |
| 5,724,346 | A | | 3/1998 | Kobayashi et al. | 370/329 |
| 5,745,699 | A | | 4/1998 | Lynn et al. | 395/200 |
| 5,754,947 | A | * | 5/1998 | Tanabe et al. | 455/515 |
| 5,838,770 | A | | 11/1998 | Fukushima et al. | |
| 5,844,905 | A | | 12/1998 | McKay et al. | |
| 5,852,778 | A | | 12/1998 | Ladedz | |
| 5,881,055 | A | | 3/1999 | Kondo | |
| 5,881,104 | A | | 3/1999 | Akahane | |
| 5,889,772 | A | | 3/1999 | Fischer et al. | 370/346 |
| 5,901,362 | A | | 5/1999 | Cheung et al. | 455/525 |
| 5,953,426 | A | | 9/1999 | Windel et al. | 380/51 |
| 5,987,011 | A | | 11/1999 | Toh | |
| 5,987,062 | A | | 11/1999 | Engwer et al. | |
| 5,991,287 | A | * | 11/1999 | Diepstraten et al. | 370/338 |
| 6,002,932 | A | | 12/1999 | Kingdon et al. | 455/433 |
| 6,031,528 | A | | 2/2000 | Langfahl, Jr. | |
| 6,055,316 | A | | 4/2000 | Perman et al. | |
| 6,058,106 | A | | 5/2000 | Cudak et al. | 370/313 |
| 6,064,678 | A | | 5/2000 | Sindhushayana et al. | 370/470 |
| 6,067,297 | A | * | 5/2000 | Beach | 370/389 |
| 6,072,836 | A | | 6/2000 | Hardiman | |
| 6,115,390 | A | * | 9/2000 | Chuah | 370/443 |
| 6,115,610 | A | | 9/2000 | Goetz et al. | |
| 6,154,461 | A | | 11/2000 | Stuniolo et al. | 370/401 |
| 6,163,810 | A | * | 12/2000 | Bhagavath et al. | 709/238 |
| 6,173,411 | B1 | | 1/2001 | Hirst et al. | |
| 6,175,856 | B1 | | 1/2001 | Riddle | |
| 6,178,327 | B1 | | 1/2001 | Gomez | |
| 6,182,043 | B1 | | 1/2001 | Boldl | |
| 6,189,039 | B1 | * | 2/2001 | Harvey et al. | 709/232 |
| 6,192,230 | B1 | | 2/2001 | van Bokhorst et al. | |
| 6,215,876 | B1 | | 4/2001 | Gilley | 380/260 |
| 6,256,334 | B1 | | 7/2001 | Adachi | 375/132 |
| 6,259,701 | B1 | * | 7/2001 | Shur et al. | 370/401 |
| 6,304,760 | B1 | | 10/2001 | Thomson et al. | |
| 6,330,231 | B1 | | 12/2001 | Bi | |
| 6,331,983 | B1 | * | 12/2001 | Haggerty et al. | 370/400 |
| 6,370,381 | B1 | | 4/2002 | Minnick et al. | 455/445 |
| 6,392,990 | B1 | | 5/2002 | Tosey et al. | |
| 6,404,756 | B1 | | 6/2002 | Whitehill et al. | |
| 6,434,134 | B1 | | 8/2002 | La Porta et al. | 370/338 |
| 6,438,108 | B1 | | 8/2002 | Kanljung et al. | |
| 6,438,365 | B1 | | 8/2002 | Balteanu | |
| 6,456,597 | B1 | * | 9/2002 | Bare | 370/252 |
| 6,456,860 | B1 | | 9/2002 | Nakagaki | 455/561 |
| 6,463,295 | B1 | | 10/2002 | Yun | |
| 6,465,399 | B2 | | 10/2002 | Koishikawa et al. | |
| 6,469,991 | B1 | | 10/2002 | Chuah | |
| 6,487,406 | B1 | | 11/2002 | Chang et al. | 455/426 |
| 6,522,888 | B1 | | 2/2003 | Garceran et al. | |
| 6,535,493 | B1 | | 3/2003 | Lee et al. | 370/329 |
| 6,538,764 | B2 | | 3/2003 | Ueda | |
| 6,553,015 | B1 | | 4/2003 | Sato | 370/331 |
| 6,577,609 | B2 | | 6/2003 | Sharony | 370/312 |
| 6,577,613 | B1 | | 6/2003 | Ramanathan | |
| 6,580,700 | B1 | | 6/2003 | Pinard et al. | 370/332 |
| 6,614,937 | B1 | | 9/2003 | Hwang | |
| 6,640,325 | B1 | | 10/2003 | Fischer | |
| 6,643,469 | B1 | | 11/2003 | Gfeller et al. | |
| 6,657,954 | B1 | | 12/2003 | Bird et al. | |
| 6,671,266 | B1 | | 12/2003 | Moon et al. | |
| 6,687,247 | B1 | * | 2/2004 | Wilford et al. | 370/392 |
| 6,690,659 | B1 | | 2/2004 | Ahmed et al. | 370/328 |
| 6,697,336 | B1 | | 2/2004 | Socher | |
| 6,697,378 | B1 | | 2/2004 | Patel | 370/468 |
| 6,701,361 | B1 | | 3/2004 | Meier | 709/224 |
| 6,714,514 | B1 | | 3/2004 | Espax et al. | 370/230 |
| 6,721,032 | B2 | | 4/2004 | Hasegawa et al. | |
| 6,745,013 | B1 | | 6/2004 | Porter | |
| 6,795,407 | B2 | | 9/2004 | Chesson | |
| 6,807,146 | B1 | | 10/2004 | McFarland | |
| 6,842,605 | B1 | | 1/2005 | Lappetelainen et al. | |
| 6,873,627 | B1 | * | 3/2005 | Miller et al. | 370/466 |
| 6,891,855 | B2 | | 5/2005 | Bruckman | |
| 6,947,483 | B2 | | 9/2005 | Engwer | |
| 6,956,867 | B1 | | 10/2005 | Suga | |
| 2001/0048744 | A1 | | 12/2001 | Kimura | |
| 2002/0009199 | A1 | | 1/2002 | Ala-Laurila et al. | 380/247 |
| 2002/0037014 | A1 | | 3/2002 | Myojo et al. | |
| 2002/0045428 | A1 | | 4/2002 | Chesson | |

OTHER PUBLICATIONS

"IEEE standard for information technology-telecommunications and information exchange between systems-local and metropolitan area networks-specific requirement. Part 11: wireless LAN medium access control (MAC) and physical layer (PHY) specification. (ISO/IEC 8802-11, ANSI/IEEE Std 802.11-1999)" Aug. 20, 1999, pp. 38-54, XP002206839.

Khayata, R. Ellen , et al., "A Distributed Medium Access Protocol for Wireless LANs", *IEEE Transactions on Communications*, (1995),238-242.

Koutroubinas, Stelios , et al., "A New Efficient Access Protocol for Integrating Multimedia Services in the Home Environment", *IEEE Transactions on Consumer Electronics*, vol. 45, Issue 3, (Aug. 1999),481-487.

* cited by examiner

RELIABLE BROADCAST PROTOCOL IN A WIRELESS LOCAL AREA NETWORK

This application claims benefit of U.S. Provisional Application No. 60/226,343, filed Aug. 18, 2000.

FIELD OF THE INVENTION

The present invention relates to the field of networking. In particular, this invention relates to a protocol for acknowledging receipt of multicast or broadcast frames communicated over a wireless network.

BACKGROUND OF THE INVENTION

The ability of users to access programs and share data over local area networks (referred to as "LANs") has become a necessity for most working environments. To improve efficiency and ease of use, certain enhancements may be added to a LAN such as remote wireless access. By providing remote wireless access, a wireless LAN (WLAN) is formed.

As described in U.S. Pat. No. 5,987,062 issued to Netwave Technologies, Inc., now owned by Nortel Networks Limited, one type of WLAN employs dedicated stations, which are referred to as access points (APs). Therein, each AP is a relay station that receives frames from a mobile unit such as a notebook-type computer with a suitable adapter card as described in U.S. Pat. No. 5,987,062. Thereafter, the AP transmits contents of these frames, namely one or more data packets, to the fixed backbone network.

Of course, the AP also receives data packets of data from the fixed backbone network for transmission to one or more mobile units. In accordance with Institute of Electrical and Electronics Engineers (IEEE) 802.11 published Nov. 16, 1998 and entitled "Wireless LAN Medium Access Control (MAC) and Physical Layer (PHY) specifications," the AP is capable of detecting whether a data packet is directed toward a specific mobile unit (referred to as "unicast frame"). Such detection is accomplished by examining a destination address from the incoming data packet and comparing this address to Media Access Control (MAC) addresses for each of its authenticated mobile units. The MAC addresses are stored in an address table maintained within the AP. If a match is detected, the data packet is sent to a wireless transceiver interface 210 to produce a unicast frame having the MAC address as its destination address. Upon receiving the contents of the unicast frame, the mobile unit transfers an acknowledgement (ACK) frame to the AP in accordance with IEEE 802.11.

Besides unicast transfers, the AP also supports the transmission of data frames to a group of mobile units (referred to as "multicast frames") or to all of the mobile units (referred to as a "broadcast frames"). In accordance with IEEE 802.11, the delivery of multicast and broadcast frames is not reliable because ACK frames are not required from the mobile units. Currently, there is no protocol for the AP to confirm whether any of its multicast or broadcast frames have been successfully received by the MUs. Since information within the multicast or broadcast frames may be vital to the operations of the WLAN, insuring their receipt would enhance the capability of the APs.

SUMMARY OF THE INVENTION

The present invention relates to a protocol for acknowledging receipt of a multicast or broadcast frame by a wireless unit is described. One embodiment, an Eavesdrop Unicast frame is created for use in a wireless network operated in accordance with IEEE 802.11. The Eavesdrop Unicast frame allows the targeted wireless unit to transmit acknowledgement (ACK) frame but is configured so that other wireless units can scan and obtain information therefrom.

Another embodiment is similar in configuration to the Eavesdrop Unicast frame but is fully compliant with IEEE 802.11. Therein, a multicast or broadcast frame is transmitted but one wireless unit is configured to acknowledge receipt of the multicast or broadcast frame. The acknowledgement is accomplished through transmission of a data frame. Yet another embodiment is the transmission of broadcast or multicast frames into corresponding unicast frames.

Other aspects and features of the present invention will become apparent to those ordinarily skilled in the art upon review of the following description of specific embodiments of the invention in conjunction with the accompanying claims and figures.

BRIEF DESCRIPTION OF THE DRAWINGS

The features and advantages of the present invention will become apparent from the following detailed description of the present invention in which.

DETAILED DESCRIPTION OF THE INVENTION

Herein, the exemplary embodiments of the present invention relate to a protocol for acknowledging receipt of multicast and broadcast frames by a wireless unit employed within a wireless network (WLAN). The WLAN may be configured in accordance with Institute of Electrical and Electronics Engineers (IEEE) 802.11 or subsequently published specifications. These embodiments are not exclusive; rather, they merely provide a thorough understanding of the present invention. Well-known circuits are not set forth in detail in order to avoid unnecessarily obscuring the present invention.

In the following description, certain terminology is used to describe features of the present invention. For example, "logic" includes hardware and/or software module(s) that perform a certain function on incoming information. A "software module" is executable code such as an operating system, an application or an applet for example. The module may be stored in any appropriate storage medium such as a hard drive a CD-ROM, memory (non-volatile or volatile), tape, etc.) The term "information" is defined as data, address, and/or control. For transmission, the information may be placed in a frame featuring a single packet or a series of packets, where each packet features a predetermined number of bits of information.

In addition, a "link" is broadly defined as one or more information-carrying mediums to establish a communication pathway. Examples of the medium include a physical medium (e.g., electrical wire, optical fiber, cable, bus traces, etc.) or a wireless medium (e.g., air in combination with wireless signaling technology).

Figure 1:
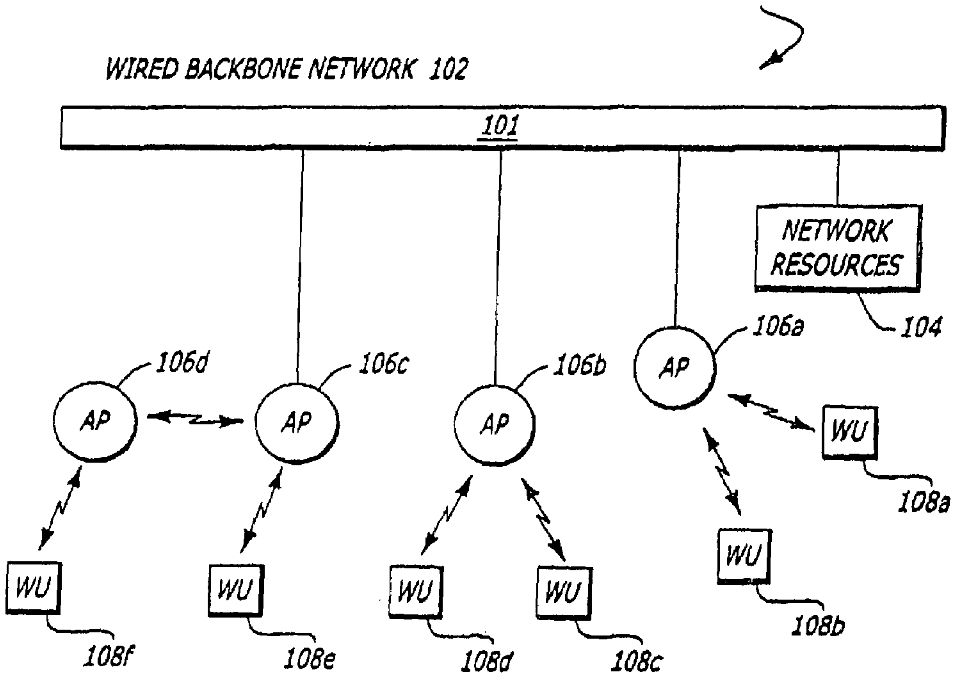
FIG. 1 is a first exemplary embodiment of a wireless network.

Referring to FIG. 1, an exemplary first embodiment of a wireless network system 100 in accordance with the invention is illustrated. The wireless network system 100 comprises a link 101 based on a physical medium. Herein, the link 101 is part of a wired backbone network 102 that includes network resources 104 available for users of the network 100. The wireless network system 100 further includes one or more access points (APs) 106*a*-106*d* that communicate via a wireless link with one or more wireless units (WUs) 108*a*-108*f*. For this embodiment, four (4) APs 106*a*-106*d* communicate with six (6) WUs 108*a*-108*f* as described below.

Users using the WUs 108*a*-108*f* can access the network resources 104 via any of the APs 106*a*-106*d*, which are generally transparent bridges that link a wireless network defined by one or more WUs 108*a*-108*f* with the wired backbone network 102. The WUs 108*a*-108*f* communicate with the APs 106*a*-106*d* typically using a standardized protocol, such as the IEEE 802.11 protocol.

A "wireless unit" (WU) is defined herein as any electronic device comprising (1) logic for processing information (e.g., a processor, microcontroller, state machine, etc.) and (2) a wireless transceiver for receiving information from and transmitting information to an access point (AP) or another wireless unit (WU). Examples of an "electronic device" include a computer (e.g., desktop computer, laptop computer, hand-held computer such as a personal digital assistant "PDA", etc.), communications equipment (e.g., pager, telephone, facsimile machine, etc.), a television set-top box, or appliances such as refrigerator pads, electronic picture frames, alarm detectors, water detectors, and the like.

An "access point" (AP) is an electronic device that provides a bi-directional connection between one or more WUs and a network such as the wired backbone network 102. However, an AP could also have a wireless connection back to the wired backbone network 102, such as AP 106*d*, which has a wireless link to the backbone network 102 via another AP 106*c*. The wired backbone network 102 can be of any type, including an Ethernet, a token ring, or an asynchronous transfer mode (ATM) network.

Figure 2:
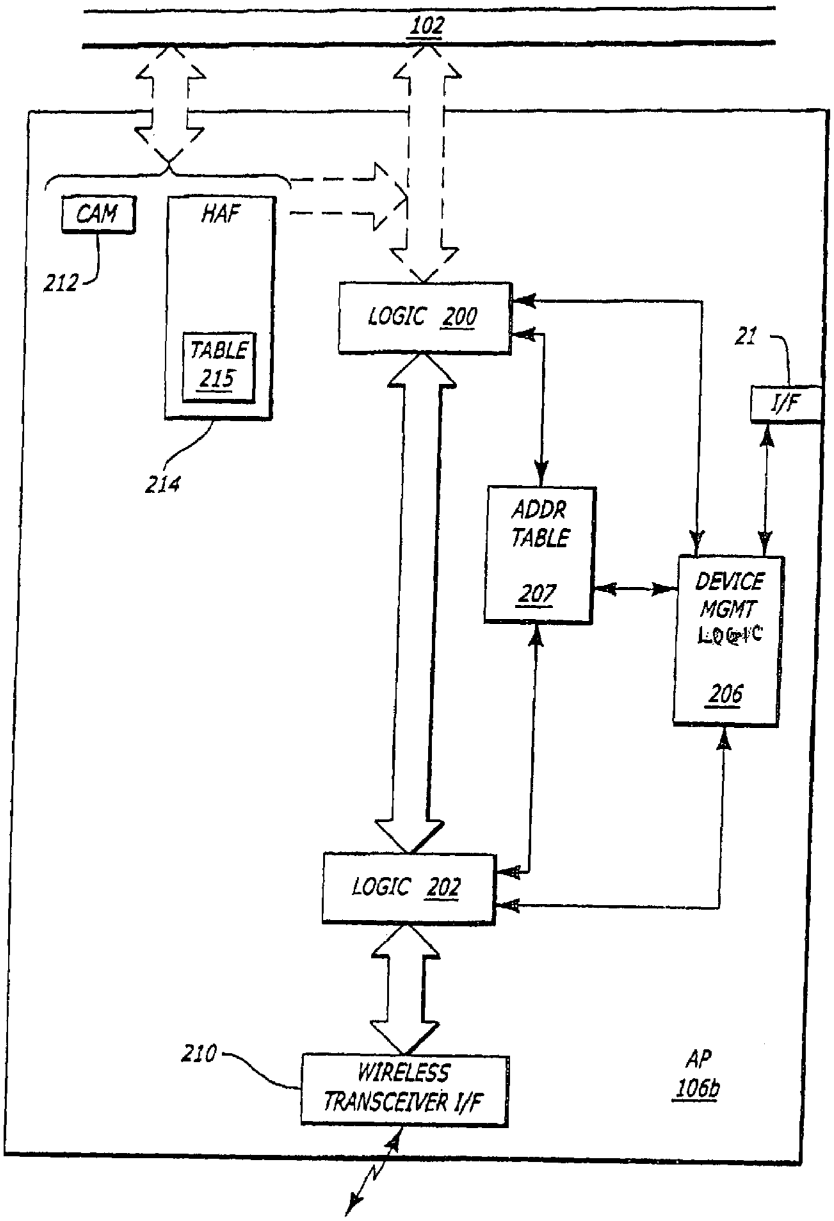
FIG. 2 is an exemplary embodiment of an access point (AP) of a wireless network.

Referring now to FIG. 2, an exemplary embodiment of an access point (AP) is shown. For illustrative purposes, the access point is represented by AP 106*b* and differs in function from the access points described in U.S. Pat. No. 5,987,062. As shown, AP 106*b* comprises logic 200 and 202, an address table 204, a device management logic 206, and a wireless transceiver interface 210. In particular, the logic 200 is used to determine whether certain information from the wired backbone network 102 is destined for one or more of the WUs. The address table 204 includes Medium Access Control (MAC) addresses for all of the wireless units associated with the AP 106*b* such as WUs 108*c* and 108*d* of FIG. 1. In the special case of all broadcast or some multicast packets, the packets are addressed to all or some of the WUs associated with the AP 106*b* on a "best effort" basis.

Similarly, as information from the WUs is received by the wireless transceiver 210, the logic 202 monitors addresses within this information against the contents of the address table 204. One reason is that only information from authenticated and associated wireless units (e.g., WUs 108*c* and 108*d*) is accepted. Hence, if information is received from a non-authenticated wireless unit, the information will not be forwarded to the wired backbone network 102 of FIG. 1. If the information is received from an authenticated wireless unit, the logic 202 subsequently transmits the information to the logic 200 for routing to the wired backbone network 102.

In the event that the fixed backbone network 102 of FIG. 1 has a substantially larger data rate than the wireless network, content addressable memory (CAM) 212 and a hardware address filter (HAF) 214 may be employed within the AP 106*b*. The CAM 212 and HAF 214 are in communication with the wired backbone network 102 and collectively filter information at the physical layer. For example, the HAF 214 examines an incoming packet from the wired backbone network 102 to determine if the destination MAC address is in its own internal table 215. The internal table 215 includes MAC addresses of devices reachable to the wired backbone network 102, namely directly coupled to the network 102 or indirectly through another AP for example. Thus, the logic 200 needs only process a portion of the information routed over the wired backbone network 102.

The device management logic 206 provides a mechanism for adjusting the various parameters and controlling the functionality of the AP 106*b*. In one embodiment, the device management logic 206 compares a destination MAC address of an incoming packet from network 102 with the MAC addresses stored within the address table 204. If a successful match is detected, the MAC address will be placed in an outgoing unicast data frame to the targeted WU.

The device management logic 206 may be configured via a port interface 216 within the AP 106*b*. The port interface 216 (e.g., a serial port) provides a direct connection to the AP 106*b*. Other mechanisms include (1) Simple Network Management Protocol (SNMP) management tools such as OPTIVITY® by Nortel Networks Limited, (2) TELNET, or (3) web-based management software.

Referring back to FIG. 1, in the typical scenario, a WU associates itself with one of the APs to communicate with the wired backbone network 102. For instance, in the example shown in FIG. 1, WUs 108*a* and 108*b* are associated with AP 106*a*, WUs 108*c* and 108*d* are associated with AP 106*b*, WU 108*e* is associated with AP 106*c*, and WU 108*f* is associated with wireless AP 106*d*. Which AP a wireless unit (WU) is associated with can depend on many factors, including signal quality, load balancing, restricted links and other factors. The AP that a particular WU is associated with can change, such as when the WU "roams" from the coverage area of a particular AP to a coverage area of another AP. From the standpoint of the user using the WU, this change in associated AP is transparent.

Figure 3:
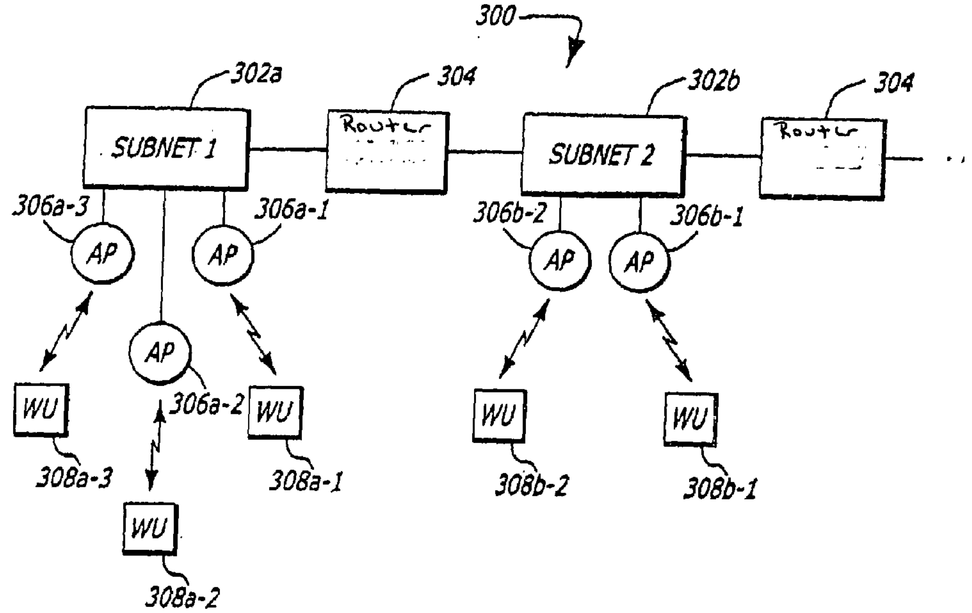
FIG. 3 is a second exemplary embodiment of a wireless network.

FIG. 3 illustrates a second exemplary embodiment of a wireless network system 300 in accordance with the invention. The wireless network system 300 comprises two or more sub-networks 302*a* and 302*b*, which communicate with each other by way of a router 304. The sub-networks 302*a* and 302*b* can be any wired backbone network, including Ethernet, token ring, and an asynchronous transfer mode (ATM) network. The sub-networks 302a and 302b need not be of the same type, for instance, sub-network 302a can be an Ethernet, and sub-network 302b can be a token ring. Each sub-network 302a and 302b has one or more APs for communicating with the WU. For instance, sub-network 302a includes APs 306a-1, 306a-2, 306a-3 for communicating respectively with WUs 308a-1, 308a-2, and 308a-3. Sub-network 302b includes APs 306b-1 and 306b-2 for communicating respectively with WUs 308b-1 and 308b-2. In this network, a WU associated with an AP on a particular sub-network (e.g. sub-network 302a) can also change its association to an AP on another sub-network (e.g. sub-network 302b) by roaming as discussed above or other circumstances.

Figure 4:
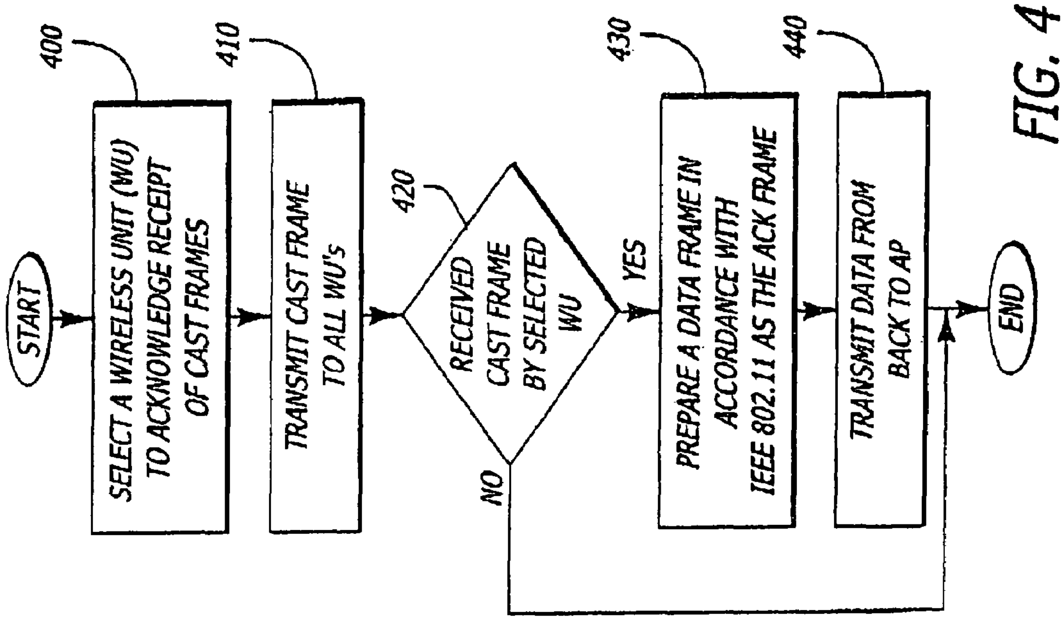
FIG. 4 is a first exemplary embodiment of a flowchart illustrating a protocol for acknowledging receipt of one or more cast frames.
Figures 5, 6, 8, 9:
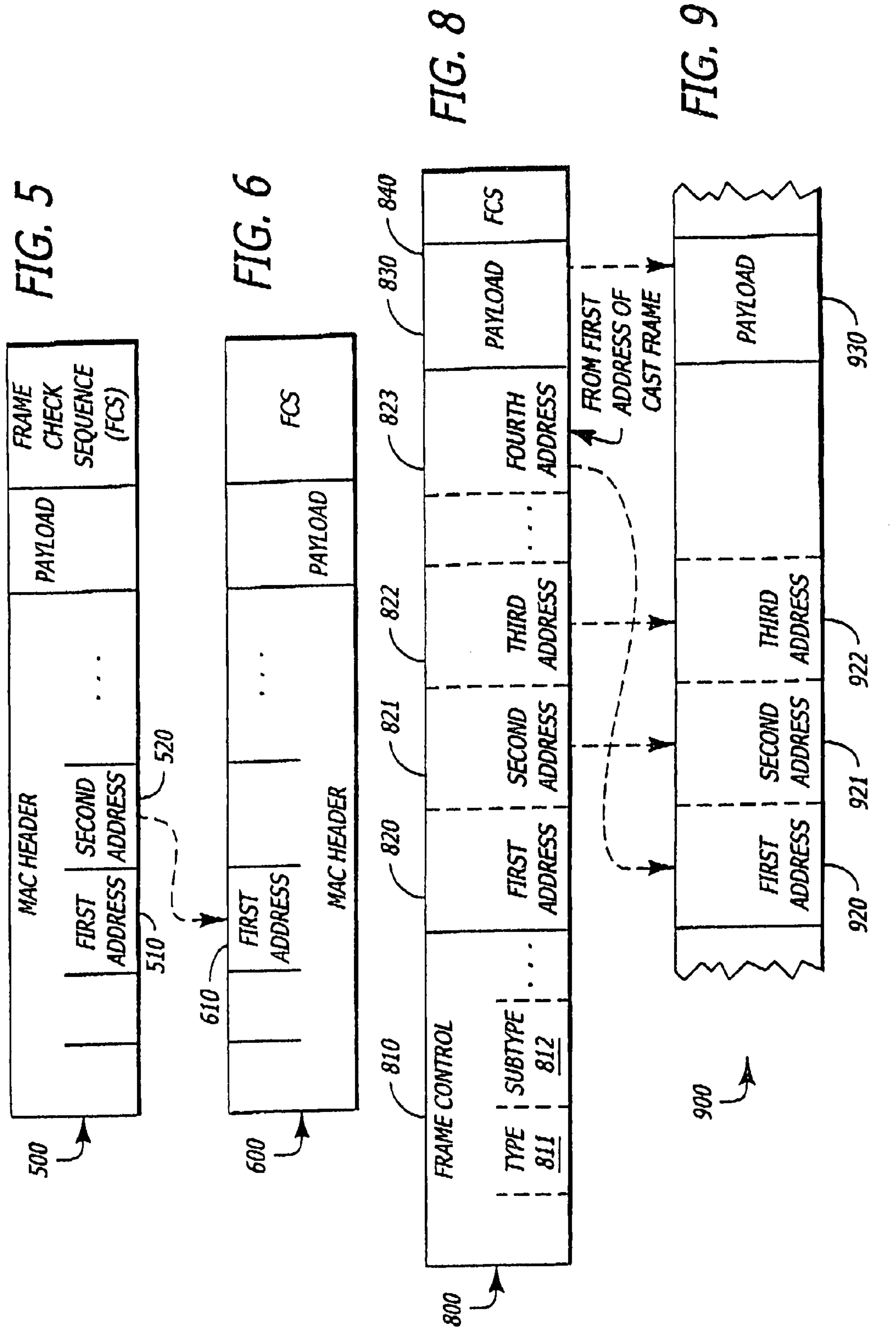
FIG. 5 is an exemplary embodiment of the cast frame utilized in the protocol of FIG. 4.
FIG. 6 is an exemplary embodiment of a data frame for acknowledging receipt of the cast frame of FIG. 5.
FIG. 8 is an exemplary embodiment of an Eavesdrop Unicast frame.
FIG. 9 is an exemplary embodiment of a translation from the Eavesdrop Unicast frame of FIG. 8 to a data frame for processing by the WU.

Referring now to FIGS. 4-6, a first exemplary embodiment of a protocol (fully compliant with IEEE 802.11) for acknowledging receipt of one or more multicast and/or broadcast frames (referred to universally as "Cast frames") over wireless network system 100 or 300 is shown. These Cast frames are data frames in accordance with IEEE 802.11 as shown in FIG. 5. A first address field 510 of the Cast frame 500 is set to a particular MAC address assigned to a group of WUs when the Cast frame 500 is a multicast frame. Similarly, the first address field 510 is set to a predetermined value (e.g., all bits are set) when the Cast frame 500 is a broadcast frame. A second address field 520 of the Cast frame 500 includes an address associated with the AP transmitting the Cast frame 500.

Referring back to FIG. 4, one of the WUs is initially selected for acknowledging receipt of all Cast frames for a particular AP (block 400). The selection of the WU may be directed toward either (i) minimizing retransmissions of the Cast frame or (ii) maximizing the likelihood that all WUs will actually be able to hear the Cast frame. In order to minimize retransmissions, the AP may analyze levels of signal quality associated with frames most recently received by the WUs and select the WU with the highest level of signal quality. In order to maximize the likelihood of hearing the Cast frame, however, the AP may select the WU with the lowest power level. It is contemplated, however, that another selection technique may be used. At some time after selection of the WU, a Cast frame is transmitted to two or more WUs including the selected WU (block 410).

In response to receiving the Cast frame (blocks 420 and 430), the selected WU transmits to the AP a data frame 600 in accordance with IEEE 802.11 in order to acknowledge receipt of the Cast frame (block 440). As shown in FIG. 6, the data frame 600 includes the contents of the second address field 520 of the Cast frame 500 of FIG. 5 within a first address field 610 of the data frame 600. This differs from any normal acknowledgement protocols in which the ACK frame is a control frame. If the AP does not eventually receive data frame 600, cast frame 500 is retransmitted.

Figure 7:
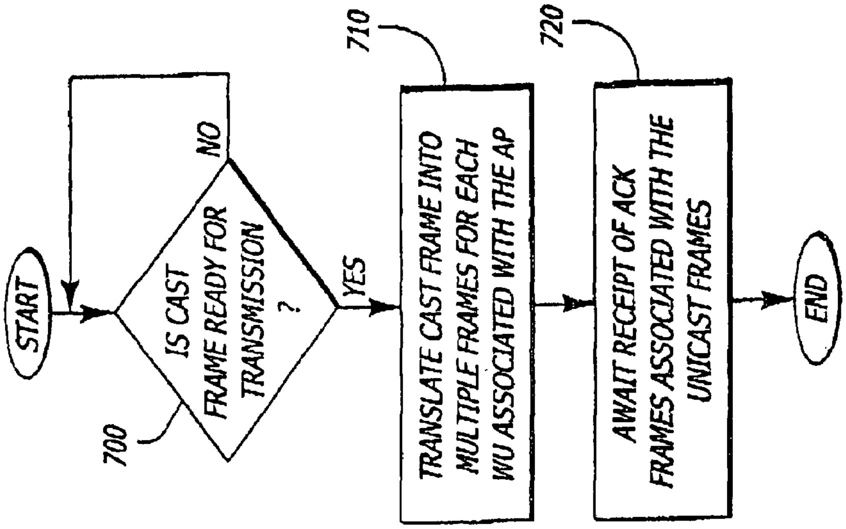
FIG. 7 is a second exemplary embodiment of a flowchart illustrating a protocol unicast for acknowledging receipt of frames translated from a cast frame.

Referring now to FIG. 7, a second exemplary embodiment of a protocol for acknowledging receipt of one or more Cast frames over wireless network system 100 or 300 is shown. When an AP determines that a Cast frame is scheduled for transmission, the Cast frame is translated into multiple unicast frames (blocks 700 and 710). The determination of whether the Cast frame is scheduled for transmission may be accomplished by either active notification of the device management logic (e.g., signal from as the HAF) or passive notification (e.g., computed by the device management logic based on quantitative data). These unicast frames are addressed with the MAC addresses for the WUs stored in the address table of the AP. Thus, in lieu of transmitting the Cast frame, multiple unicast frames are transmitted in succession to the WUs associated with the AP (block 720) and await a return acknowledgement (ACK) frame from one or more of the WUs.

Figure 10:
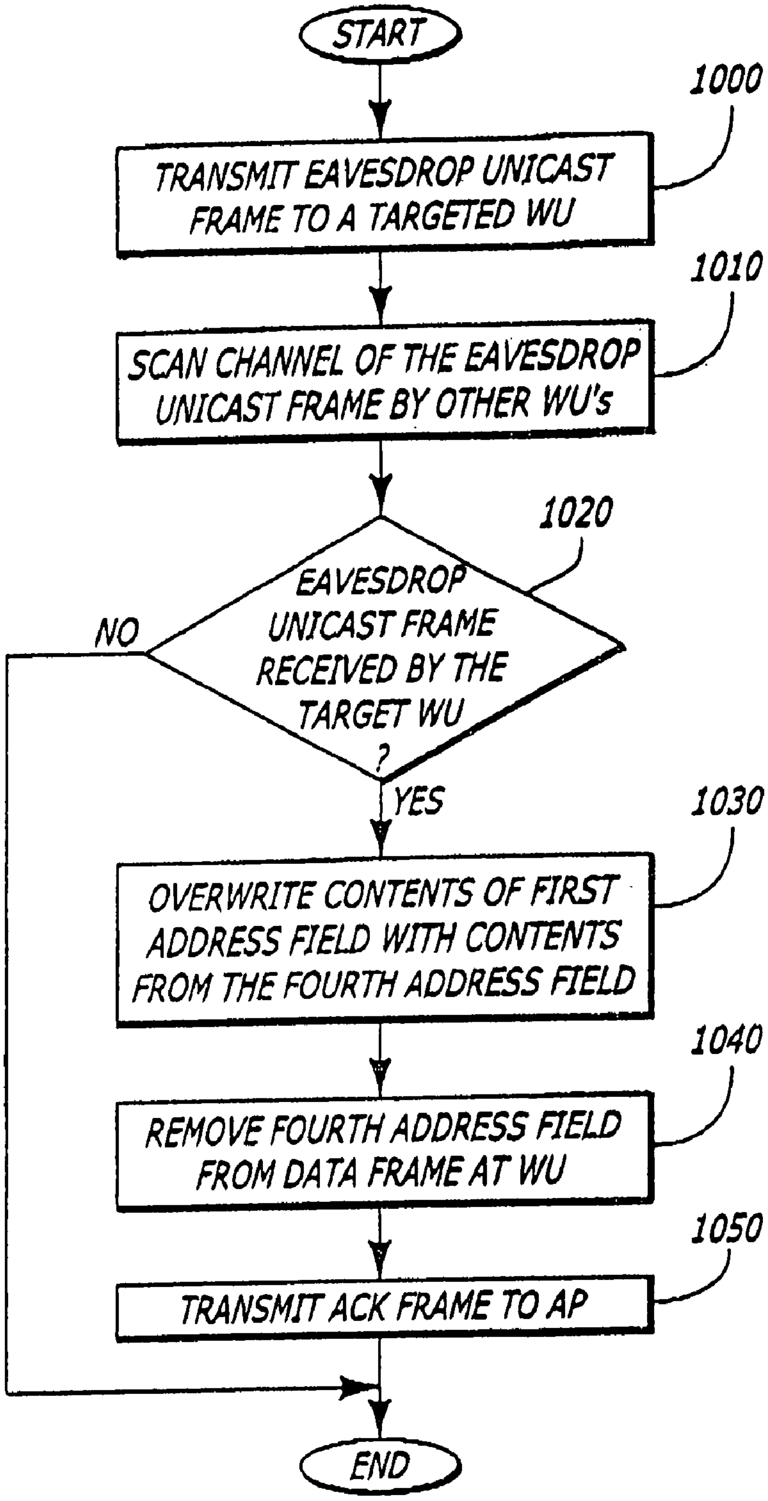
FIG. 10 is a third exemplary embodiment of a flowchart illustrating a protocol for acknowledging receipt of an Eavesdrop Unicast frame of FIG. 8.

Referring now to FIGS. 8-10, a third exemplary embodiment of a protocol for acknowledging receipt of an Eavesdrop Unicast frame, which is transmitted over wireless network system in lieu of a multicast or broadcast frame. Herein, the Eavesdrop Unicast frame 800 comprises a frame control field 810 including a type field 811, a subtype field 812, first-fourth address fields 820-823, a payload field 830 and a frame check sequence (FCS) field 840. The type field 811 would be set to indicate that the Eavesdrop Unicast frame 800 is a data frame. The subtype field 812 would be loaded with data to identify that the new subframe type is the Eavesdrop Unicast frame 800.

With respect to the address fields 820-823 of the Eavesdrop Unicast frame 800, the first address field 820 includes a destination address of the targeted WU in lieu of a value to identify the frame as a standard broadcast or multicast frame. The fourth address field 823 includes a particular MAC address assigned to a group of WUs when the Eavesdrop Unicast frame 800 is a multicast frame, which is normally placed in the first address field of a standard multicast frame. Alternatively, the fourth address field 823 is set to a predetermined value (e.g., all bits are set) when the Eavesdrop Unicast frame 800 is a broadcast frame.

As shown in FIG. 9, the translation from the Eavesdrop Unicast frame to a data frame 900 for processing by the WU is shown. In particular, the contents from the fourth address field 823 are loaded as the contents of a first address field 920 of the data frame 900. Thereafter, contents of the Eavesdrop Unicast frame 800 are loaded into corresponding fields of the data frame 900 such as the contents of the payload fields 830 and 930, contents of the second and third address fields 821, 921, 822 and 922. As shown, the contents of the first address field 920 are loaded by the contents from the fourth address field 823 of the Eavesdrop Unicast frame 800. The bits associated with the fourth address field 823 of the Eavesdrop Unicast frame are removed and are not existent in the data frame 900.

Referring now to FIG. 10, a flowchart associated with the protocol for acknowledging receipt of an Eavesdrop Unicast frame is shown. Herein, the Eavesdrop Unicast frame is initially transmitted to a targeted WU; however, the other WUs associated with the AP are required to scan to the particular channel carrying the Eavesdrop Unicast frame (blocks 1000 and 1010). The selection of the targeted WU may be based on signal quality levels associated with frames most recently received by the WUs, perceived power levels of incoming frames or other characteristics.

In response to receiving the Eavesdrop Unicast frame (block 1020), the selected WU overwrites the first address field 820 with the contents of the fourth address field 833 and removes the fourth address field 823 from the received frame (blocks 1030 and 1040). The second and third address fields 821 and 822 still include the MAC address associated with the AP and originating device, respectfully.

Additionally, the selected WU transmits an acknowledgement (ACK) frame in accordance with IEEE 802.11 to the AP (block 1050). The ACK frame indicates that the selected WU has received the Eavesdrop Unicast frame and provides an inference that most or all of the other WUs likely listened and received the contents of the Eavesdrop Unicast frame as well.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method comprising:

transmitting an Eavesdrop Unicast frame to a destination device by a transmitting device, the Eavesdrop Unicast frame includes at least four address fields, a first address field including a destination address of the destination device and a fourth address field including either a medium access control (MAC) address assigned to a plurality of devices including the destination device or a predetermined value; and receiving at the transmitting device a data frame assembled in accordance with Institute of Electrical and Electronics Engineers (IEEE) 802.11 having a type field identifying the frame to be a data type, from the destination device in response to the destination device receiving the Eavesdrop Unicast frame for acknowledgement of receipt of the Eavesdrop Unicast frame, the contents within a first address field of the data frame having been overwritten with contents from the fourth address field of the Eavesdrop Unicast frame.

2. The method of claim 1, wherein prior to receiving the data frame, the method further comprises:

scanning a channel carrying the Eavesdrop Unicast frame by a plurality of devices including the destination device;

receiving of the Eavesdrop Unicast frame by the destination device.

3. The method of claim 1, wherein the destination device is a wireless unit.

4. The method of claim 1, wherein prior to transmitting the Eavesdrop Unicast frame, the method further comprising:

translating a cast frame into the Eavesdrop Unicast frame.

5. The method of claim 4, wherein the translating of the cast frame into the Eavesdrop Unicast frame comprises substituting either (i) the MAC address assigned to the plurality of devices identifying the cast frame as a multicast frame or (ii) the predetermined value identifying the cast frame as a broadcast frame, with the destination address; and inserting the MAC address assigned to the plurality of devices or the predetermined value into the fourth address field of the at least four address fields of the Eavesdrop Unicast frame.

6. A method comprising:

determining by an access point whether a cast frame is scheduled for transmission, the determining whether the cast frame is scheduled for transmission includes active notification of device management logic implemented within the access point by a hardware address filter implemented within the access point; and translating the cast frame into a plurality of unicast frames, each of the plurality of unicast frames being uniquely addressed with a media access control (MAC) address of a wireless unit, the MAC addresses are internally stored within the access point.

7. The method of claim 6, wherein the cast frame is a multicast frame directed to a predetermined group of wireless units.

8. The method of claim 6, wherein the cast frame is a broadcast frame intended for every wireless unit within a range to receive the frame.

9. The method of claim 6 further comprising:

transmitting the unicast frames in succession to the wireless units addressed by the MAC addresses.

10. The method of claim 9 further comprising:

receiving the acknowledgement frame from each of the wireless units addressed by the MAC addresses.

11. A method comprising:

determining by an access point whether a cast frame is scheduled for transmission to a plurality of wireless units, the determining whether the cast frame is scheduled for transmission includes active notification of device management logic implemented within the access point by a hardware address filter implemented within the access point;

translating the cast frame for transmission into a plurality of unicast frames each uniquely addressed with a media access control (MAC) address of a wireless unit of the plurality of wireless units; and transmitting the plurality of unicast frames in succession to the plurality of wireless units.

12. The method of claim 11, wherein the cast frame is one of (i) a multicast frame directed to a predetermined group of wireless units in communication with the access point forming the plurality of wireless units and (ii) a broadcast frame directed for every wireless unit within a range to receive the broadcast frame including the plurality of wireless units.

13. The method of claim 11, wherein the translating of the cast frame includes accessing MAC addresses of the plurality of wireless units stored within the access point and using the MAC addresses as destination addresses for corresponding plurality of unicast frames.

14. A method for transmitting information to a plurality of devices, comprising:

translating a cast frame into an Eavesdrop Unicast frame, the Eavesdrop Unicast frame being a data frame that includes at least four address fields with (i) a first address field including a destination address of a targeted destination device that is substituted for information within a first address field of the cast frame identifying the cast frame as a broadcast frame or a multicast frame and (ii) a fourth address field including the information from the first address field of the cast frame; and transmitting an Eavesdrop Unicast frame to the destination device.

15. The method of claim 14 further comprising:

receiving at the transmitting device a data frame including a type field identifying the frame to be a data type from the destination device, being a wireless unit, in response to the destination device receiving the Eavesdrop Unicast frame, the data frame being used to acknowledge receipt of the Eavesdrop Unicast frame, the contents within a first address field of the data frame having been overwritten with contents from the fourth address field of the Eavesdrop Unicast frame.

16. The method of claim 14, wherein the destination device is a wireless unit.

17. A method for transmitting information to a plurality of devices, comprising:

transmitting an Eavesdrop Unicast frame to a destination device, the Eavesdrop Unicast frame being a data frame that includes a first address field including a destination address of the destination device and a second address field including information to identify the Eavesdrop Unicast frame being a translation of a broadcast frame; and receiving a data frame in response to the destination device receiving the Eavesdrop Unicast frame, the data frame being used to acknowledge receipt of the Eavesdrop Unicast frame, the contents within a first address field of the data frame having been overwritten with contents from the second address field of the Eavesdrop Unicast frame.

18. A method for transmitting information to a plurality of devices, comprising:

translating a cast frame into an Eavesdrop Unicast frame; and transmitting the Eavesdrop Unicast frame to a destination device, the Eavesdrop Unicast frame being a data frame that includes at least four address fields, a first address field including a destination address of the destination device and a fourth address field including a value assigned to the plurality of devices including the destination device; and receiving a data frame from the destination device in response to the destination device receiving the Eavesdrop Unicast frame, the data frame being used to acknowledge receipt of the Eavesdrop Unicast frame, the contents within a first address field of the data frame having been overwritten with contents from the fourth address field of the Eavesdrop Unicast frame.

19. The method of claim 18, wherein the value is a medium access control (MAC) address.

* * * * *